United States Patent
O'Brien et al.

(10) Patent No.: US 8,432,932 B2
(45) Date of Patent: Apr. 30, 2013

(54) PROVIDING BLENDED SYNCHRONOUS/ASYNCHRONOUS MESSAGING

(75) Inventors: Michael R. O'Brien, Westford, MA (US); Niklas Heidloff, Salzkotten (DE); Gregory R. Klouda, Lancaster, MA (US); James P. Galvin, Jr., Oak Ridge, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/611,003

(22) Filed: Sep. 12, 2012

(65) Prior Publication Data
US 2013/0007163 A1    Jan. 3, 2013

Related U.S. Application Data

(63) Continuation of application No. 11/141,172, filed on May 31, 2005, now Pat. No. 8,306,056.

(51) Int. Cl.
*H04J 3/16*    (2006.01)
(52) U.S. Cl.
USPC .................................. 370/456; 455/412.2

(58) Field of Classification Search ............... 370/466, 370/456; 455/412.2
See application file for complete search history.

(56) References Cited

U.S. PATENT DOCUMENTS

| | | | | |
|---|---|---|---|---|
| 2002/0133507 | A1* | 9/2002 | Holenstein et al. | 707/200 |
| 2007/0280160 | A1* | 12/2007 | Kim et al. | 370/331 |
| 2008/0056190 | A1* | 3/2008 | Kim | 370/331 |

* cited by examiner

*Primary Examiner* — Sai-Ming Chan
(74) *Attorney, Agent, or Firm* — David A. Dagg (57) ABSTRACT

A system for blending synchronous and asynchronous computer communication applications that determines when a user of a synchronous communication application, such as an instant messaging application, attempts to send a message to another user that is unavailable for synchronous communications, and that forwards the message from the synchronous communication application to an asynchronous communication application for delivery. The forwarded message may be an email message, and the system may operate to determine a destination electronic mail address of the destination user for inclusion in the forwarded message, and include an indication in the forwarded message that it has been forwarded from the synchronous communication application. This indication enables the asynchronous communication application to perform special processing with regard to the forwarded message.

17 Claims, 6 Drawing Sheets

PROVIDING BLENDED SYNCHRONOUS/ASYNCHRONOUS MESSAGING

CROSS-REFERENCE TO RELATED APPLICATIONS

The present application is a Continuation application under 35 U.S.C. 120 of commonly owned prior application Ser. No. 11/141,172, filed on May 31, 2005 in the names of Michael R. O'Brien et al., now allowed, all disclosures of which are hereby included by reference herein.

FIELD OF THE INVENTION

The present invention relates generally to electronic communication systems, and more specifically to a method and system for providing blended synchronous and asynchronous electronic communications between computer system users.

BACKGROUND OF THE INVENTION

In modern computer systems, communication between users is provided through a variety of software applications. Two of the most popular are instant messaging and electronic mail ("email"). As it is generally known, instant messaging systems are an example of what are referred to as "synchronous" communication systems. In synchronous communication systems, communication is possible only between users that are simultaneously online. Electronic mail is an example of what are referred to as "asynchronous" communication systems, in which messages can be sent from a sending user to a receiving user regardless of whether both users are currently online. When an email message is sent to a user that is currently unavailable for synchronous communications, the email software receives the message on behalf of the user, and stores it for later retrieval. When the unavailable user subsequently goes online, he or she can retrieve the stored message by accessing it from an Inbox data structure or the like.

A problem may arise when a user of a synchronous communication system tries to communicate with another user that is either not currently online, or has indicated to their communication software that they are not to be disturbed by synchronous messages. In existing systems, such a situation may prevent the user wishing to send the message from sending the message using their current or preferred synchronous communication application. Moreover, if a synchronous communication system user begins entering a lengthy message for another user who is initially online, but then subsequently becomes disconnected before the message is completely entered and sent, the entered message may not be deliverable using the synchronous communication system. Under these circumstances, the sending user may have to completely re-enter the message into the synchronous communication application later when the other user is online. Alternatively, the sending user may have to cut or otherwise extract the entered message from the synchronous communication system, and then paste it into a message entry interface of a separate, asynchronous communication application, such as an email application. While some existing synchronous messaging systems provide a notification indicating when the other goes online, the user attempting to send the synchronous message may themselves not be online at that later time. These problems are increasing significant in view of the growing popularity of instant messaging services, such as AOL's Instant Messenger (AIM), AOL's ICQ, Microsoft's MSN Messenger/Windows Messenger and Yahoo! Messenger, and others such as Cerulean Studio's Trillian, which is a single instant messaging program that works with all of these services, as well as the Internet's traditional IRC (Internet Relay Chat) chat rooms.

For the above reasons and others, it would be desirable to have a new communication system that blends features of synchronous and asynchronous communication systems to allow online users to more conveniently communicate with offline users without having to manually switch between multiple, independent application programs, and/or having to re-enter or move message content from a synchronous communication system message interface to a message entry interface of an asynchronous communication system.

SUMMARY OF THE INVENTION

To address the above described and other shortcomings of prior solutions, a new method and system for blending synchronous and asynchronous computer communication applications is disclosed. In the disclosed system, when a user of a synchronous communication application, such as an instant messaging application, attempts to send a message to another user that is unavailable for synchronous communications, the disclosed system forwards the message from the synchronous communication application to an asynchronous communication application for delivery to the other user. The asynchronous communication system may, for example, be an electronic mail ("email") application or the like, and the forwarded message may similarly be an email message or other appropriate message type. A user may be considered unavailable for synchronous communications if that user is currently offline, is away from their computer, or has indicated to the synchronous communication application that they are currently unavailable.

In order to forward the message entered into the synchronous communication application to the asynchronous communication application, the disclosed system may operate to determine a destination address of the destination user that is understood by the asynchronous communication application, such as an email address. Such a determination may require maintenance of and reference to a mapping between user names understood by the synchronous communication application and the asynchronous communication application.

The message forwarded from the synchronous communication application to the asynchronous communication application may be provided with an indication that the message has been forwarded from the synchronous communication application. This indication is provided so that the asynchronous communication application can perform special processing when the receiving user retrieves it from an Inbox data structure or the like. This special processing may include automatically determining whether the sending user is currently available for synchronous communications using the synchronous communication application. In the event that the sending user is currently available for synchronous communications, the asynchronous communication application may operate to automatically initiate a synchronous communication session between the receiving user and the sending user in response to the receiving user retrieving the forwarded message from the asynchronous communication application. Alternatively, in response to the receiving user retrieving the forwarded message, the asynchronous communication application may provide a button or other user interface option allowing the receiving user to initiate a synchronous communication session with the sending user. If the sending user is not currently available for synchronous communications, the receiving user is provided with the option of responding to the forwarded message using the asynchronous communication application.

Thus there is disclosed a new communication system that blends features of synchronous and asynchronous communication systems to allow online users to more conveniently communicate with offline users without having to manually switch between multiple, independent application programs, and/or having to re-enter or move message content from a synchronous communication system message interface to a message entry interface of an asynchronous communication system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
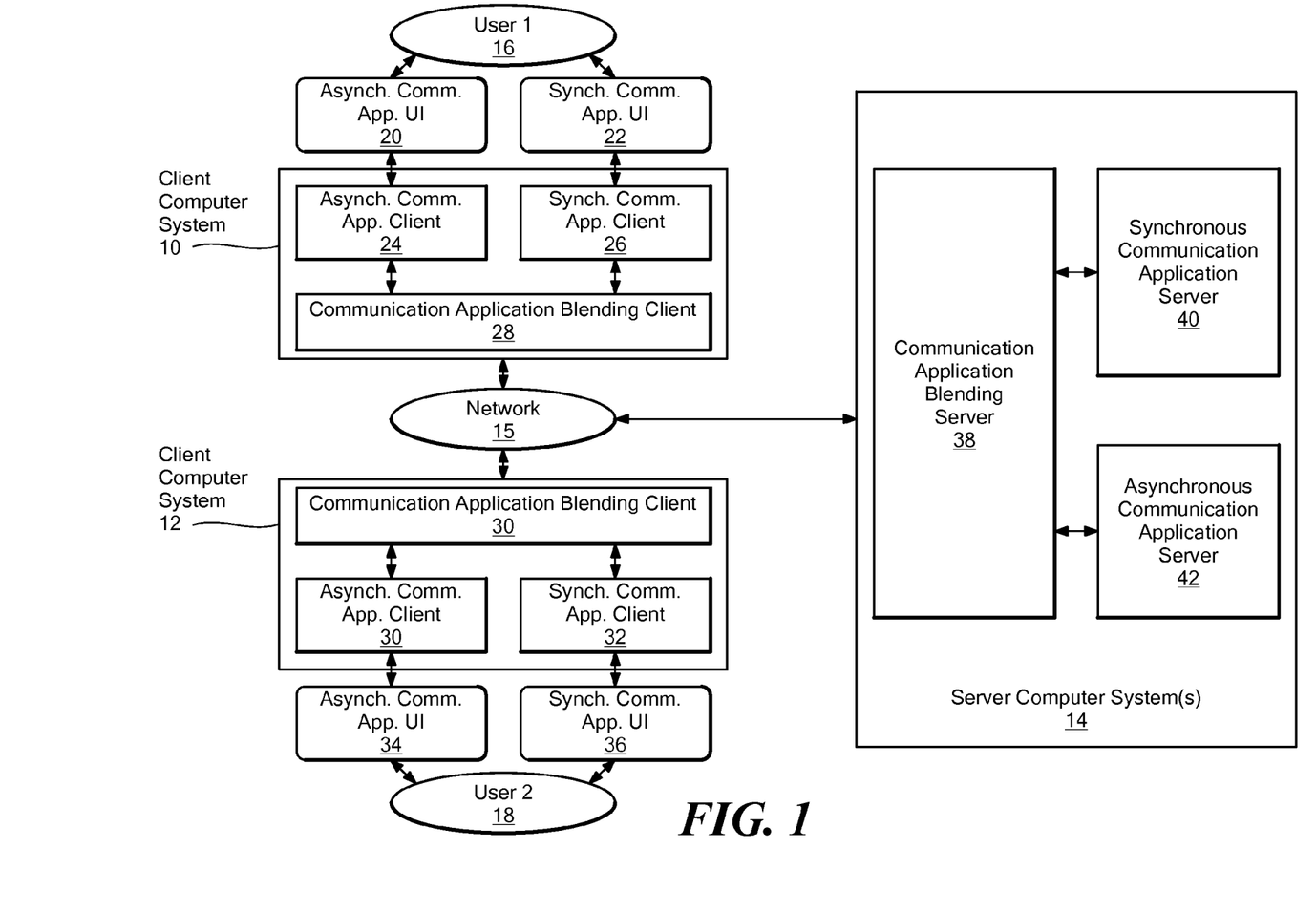
FIG. 1 is a block diagram showing software components in an illustrative embodiment.

As shown in FIG. 1, an illustrative embodiment of the disclosed system operates using a number of software components executing on a number of client computer systems, shown for purposes of illustration as the client computer systems 10 and 12, and potentially also on a number of server computer systems, shown for purposes of illustration as server computer system(s) 14. The client computer systems 10 and 12, and server computer system(s) 14 may, for example, each include at least one processor, program storage, such as memory, for storing program code executable on the processor, and one or more input/output devices and/or interfaces, such as data communication and/or peripheral devices and/or interfaces. The client computer systems 10 and 12 and server computer system 14 are communicably connected by a data communication network 15, such as a Local Area Network (LAN), the Internet, or the like, which may also be connected to a number of other client and/or server computer systems. The client computer systems 10 and 12 and server computer system(s) 14 may further include appropriate operating system software.

The embodiment of the disclosed system shown in FIG. 1 facilitates communication between a user of a client computer system 10, shown as user 1 16, and another user of a another client computer system 12, shown as user 2 18. User 1 16 may be provided with an asynchronous communication application user interface 20, as well as a synchronous communication application user interface 22. The asynchronous communication application user interface 20 and synchronous communication application user interface 22 are provided by asynchronous communication application client software 24 and synchronous communication application client software 26. Communication application blending client software 28 is also shown executing on the client computer system 10.

User 2 18 may similarly be provided with an asynchronous communication application user interface 34 and synchronous communication application user interface 36, provided respectively by an asynchronous communication application client 30 and a synchronous communication application client 32. Communication application blending client software 30 is also shown executing on the client computer system 12.

A server computer system(s) 14 is also shown in FIG. 1, executing synchronous communication application server software 40, asynchronous communication application server 42, and communication application blending server software 38.

The synchronous communication application components 26, 32 and 40 of FIG. 1 may, for example, be components of an instant messaging service. The instant messaging service may be of any specific type, including those based on proprietary or non-proprietary protocols, and operates by exchanging messages in real-time between users. The instant messaging service requires that parties be logged onto the instant messaging service, and therefore considered to be "online" at the same time for messages to be exchanged. The asynchronous communication application components 24, 30 and 42 may, for example, be components of an electronic mail ("email") application. The email application may be of any specific type, and operates by accepting and storing messages on behalf of recipient users, regardless of whether they are logged in or online, for later retrieval. For example, the asynchronous communication application clients 24 an 30 may operate to pull messages for the respective users 16 and 18 from the asynchronous communication application server 42.

A messaging system providing store and forward capability, such as the Internet's Simple Mail Transfer Protocol (SMTP), may be used by, or contained partly or wholly within the asynchronous communication application components 24, 30 and 42. The asynchronous communication application clients 24 and 30, and synchronous communication application components 26 and 32 may, for example, consist of specific individual client programs, or may consist of separate application services provided through a Web browser program or through an integrated application platform executing on the client computer systems 10 and 12. The various software components of FIG. 1 may be designed and/or configured to exchange data or messages with each other through various application programming interfaces (APIs).

During operation of the components shown in FIG. 1, user 1 16 attempts to send a message to user 2 18 by entering the message into the synchronous communication application user interface 22. However, prior to the message being delivered to user 2 18 through the synchronous communication application user interface 36, user 2 18 becomes unavailable for receiving such synchronous messages. For example, user 2 18 may have become unavailable because they have logged off from an instant messaging service, because they have indicated that they should not be disturbed by instant messages, or for some other reason. The disclosed system detects that user 2 18 has become unavailable for receiving synchronous messages, and operates to forward the message entered into the synchronous communication application user interface 22 to user 2 18 through the asynchronous communication application. For example, the communication application blending server 38, and/or communication application blending client 28 may detect that user 2 18 is unavailable for synchronous messages, and that user 1 has attempted to send user 2 18 a synchronous messages, for example from user availability information in the synchronous communication application server 40 and/or synchronous communication application client 26. In response, the communication application blending client 28 and/or communication application blending server 38 forms an email message that is sent to an email destination address associated with user 2 18.

The application blending client 28 and/or communication application blending server 38 may determine an email address of user 2 18 in a variety of ways. For example, a directory or database, including instant messaging "screen names" or "handles" recognized by the synchronous communication application components 26, 40 and 36, as well as corresponding email addresses recognized by the asynchronous communication application components 24, 42 and 30, may be stored in the server computer system(s) 14 and accessible to the communication application blending server software 38. In such an embodiment, the communication application blending server software 38 operates to look up the email address of user 2 18 based on an instant messaging handle associated with user 2 18. If both user 1 16 and user 2 18 are users of a corporate network, such information may be extracted from a corporation wide, centrally managed employee contact information directory. If it is determined that the synchronous communication application handle and email address for user 2 18 are the same, for example in a system in which all synchronous communication application handles and email addresses are the same, then no separate lookup is required to determine the email address.

The email message sent to user 2 18 includes the contents of the message entered by user 1 16 into the synchronous communication application user interface 22, and may also include an indication, such as a flag or special code contained within a header field or body of the email message, that the email message includes a forwarded synchronous communication application message. The email message sent to user 2 18 may further include the synchronous communication application handle of user 1 16, an email address of user 1 16, and a chat history reflecting previous communications between user 1 16 and user 2 18 performed using the synchronous communication application components 26, 40 and 32. Once the email message is formed, it can be sent to user 2 18, for example through an SMTP software component accessible to or contained by either the communication application blending client 28 or the communication application blending server 38. The asynchronous communication application server 42 receives the email message on behalf of the user 2 18.

The email message is subsequently passed to the client computer system 12, for example in an Inbox structure of the asynchronous communication application client 30, and presented to user 2 18 through the asynchronous communication application user interface 34. The disclosed system performs special processing of the email message in response to the indication contained in the email message that it contains a forwarded synchronous communication application message. Such special processing may include automatically detecting the email message in the Inbox for user 2 18, for example by an agent process within the communication application blending client 30, and attempting to form a synchronous communication application session, or "chat" session, between user 1 16 and user 2 18 in response to such detection. Such a synchronous communication application session would be successfully formed if, at the time the email message containing the forwarded synchronous communication application message is detected in the Inbox for user 2 18, both user 1 16 and user 2 18 are available for receiving synchronous communication application messages. Moreover, user 2 may further be provided with an initial option of expressly declining or accepting the synchronous communication application session with user 1 16 through either the asynchronous communication application user interface 34 or the synchronous communication application user interface 36. User 2 18 may alternatively reply to the email message by sending another email message back to user 1 16 through the asynchronous communication application components 30, 42 and 24. In the event that a synchronous communication application session is formed between user 2 18 and user 1 16, it may initially be set up to include the chat history between user 1 16 and user 2 18 contained in the email message also containing the forwarded synchronous communication application message.

Those skilled in the art will recognize that while the embodiment of FIG. 1 is based on a client-server model implementation, in which the functions of the disclosed system are distributed across client and server computer platforms, the present invention is not so limited. Accordingly, the disclosed system may alternatively be embodied using various other architectural approaches, such that the functions of the disclosed system are provided completely within software executing on or within a client or server platform, on a peer system within a peer to peer network, within the synchronous communication application and/or asynchronous communication application, or in some other functional distribution or configuration.

Figure 2:
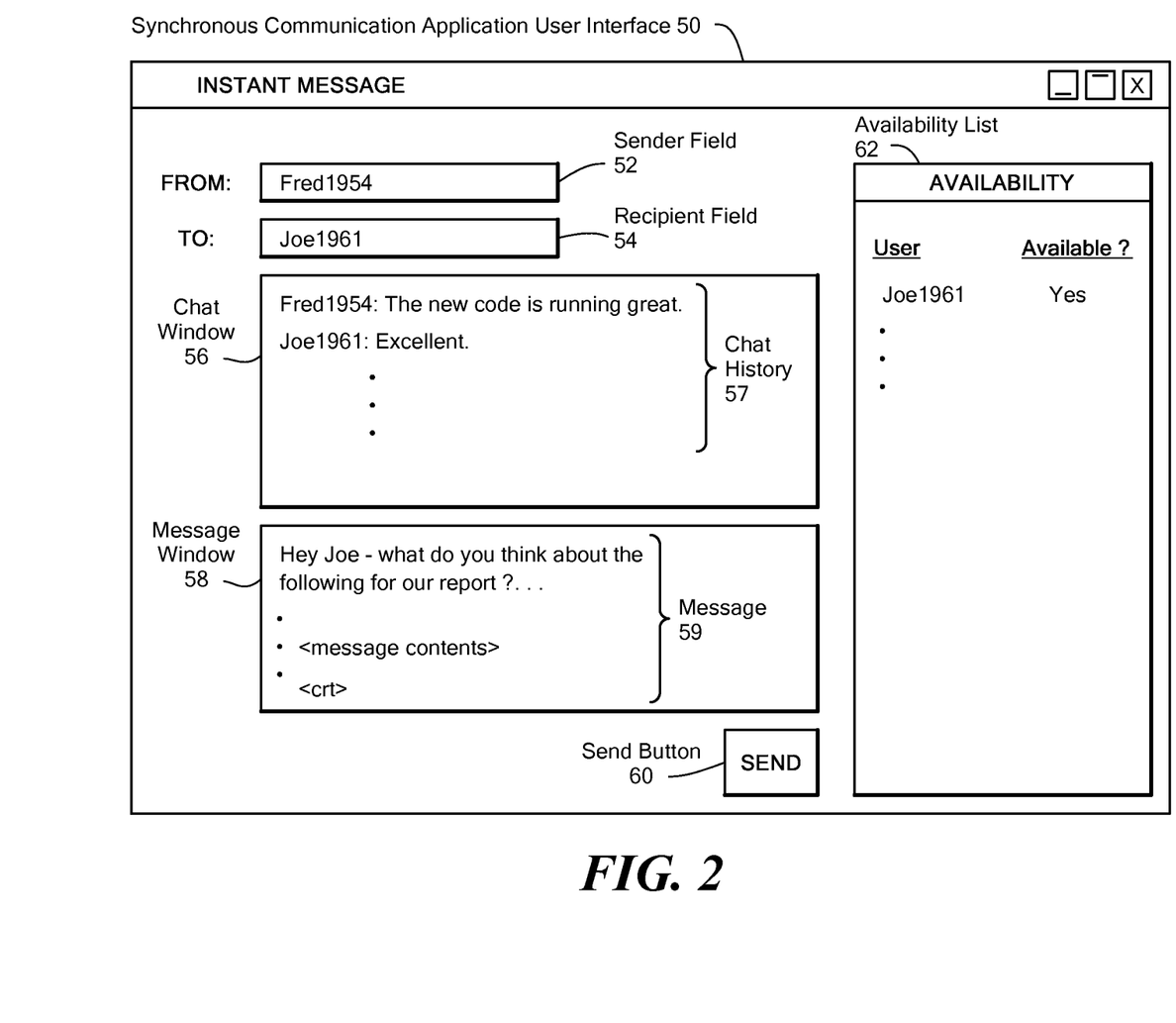
FIG. 2 is a simplified portion of a screen shot showing an example of a user interface to a synchronous communication system in an illustrative embodiment.

FIG. 2 is a simplified screen shot showing an example of a synchronous communication application user interface 50 in an illustrative embodiment of the disclosed system. The user interface 50 of FIG. 2 is includes a sender field 52, a recipient field 54, a chat window 56, a message window 58, a send button 60, and an availability list 62.

During operation of the disclosed system, a local user associated with the handle "Fred1954" enters a message 59 into the message window 58, to be included in a chat session with another user identified by the handle "Joe1961" in the recipient field 54. When the local user hits carriage return ("<crt>"), or clicks on the send button 60, the message 59 is sent to Joe1961. A chat history 57 of previous messages between "Fred1954" and "Joe1961" is contained in the chat window 56.

The entries in the availability list 62 indicate whether other users are currently available to receive instant messages. A user can indicate that they are currently not available to receive instant messages, or the system may automatically detect when a user is off-line, or unavailable for some other reason. In the example of FIG. 2, Joe1961 is indicated to be available. Accordingly, the local user Fred1954 may have begun entering message 59 while Joe1961 was indicated as available to receive synchronous messages, and eventually hit carriage return, or clicked on the send button 60, to cause message 59 to be sent to Joe1961. Alternatively, Fred1954 may have entered message 59 while Joe1961 was indicated as unavailable for receiving synchronous messages. The present system may be embodied to allow the local user to initiate sending of the message 59, even when the indicated recipient's status has changed to unavailable. In either case, for purposes of explanation, at some point in time Joe1961 becomes unavailable to receive instant messages, prior to delivery of message 59. The disclosed system may operate to provide a notification in the user interface at some point indicating that Joe1961 is unavailable, and that accordingly message 59 cannot be delivered as an instant message, but can be included in an email message forwarded to Joe1961. Such a notification may include a window having buttons display objects or the like allowing the local user to select or reject the option of sending message 59 as an email message. Alternatively, the disclosed system may simply detect that the local user has sent message 59 at a time when Joe1961 is unavailable, and automatically forward message 59 in an email message sent to an email address corresponding to the screen name Joe1961. The email message including message 59 may further include the sender screen name Fred1954, as well as the chat history 57.

Figure 3:
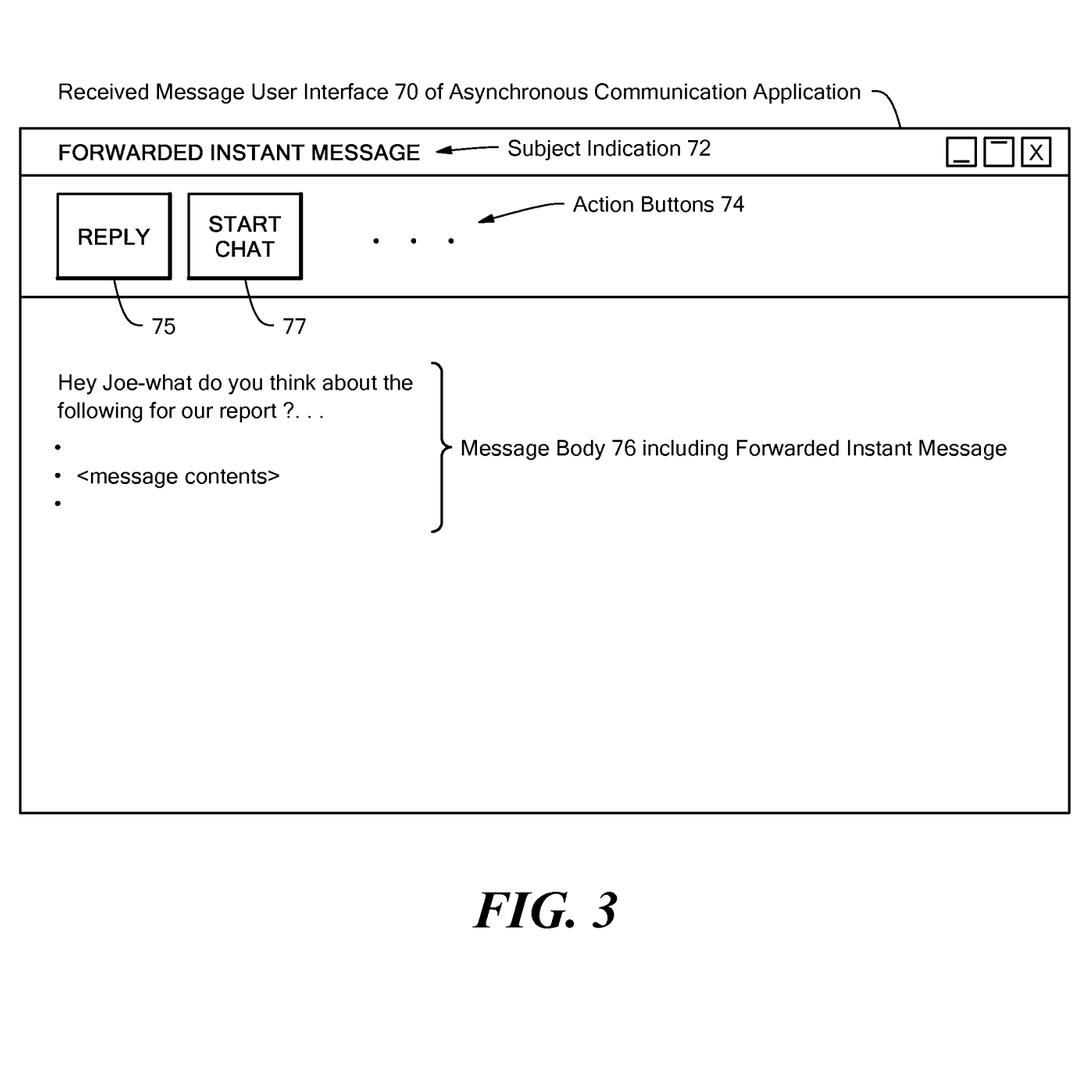
FIG. 3 is a simplified portion of a screen shot showing a user interface to a synchronous communication application.

FIG. 3 shows a simplified screen shot illustrating a received message user interface 70 provided by an asynchronous communication application, such as the asynchronous communication application client 30 of FIG. 1. The user interface 70 may, for example be provided to a user in response to that user clicking on, or otherwise selecting for retrieval, a message stored in an Inbox structure or the like used to represent received asynchronous messages, such as received email messages, that are retrievable by the user. As shown in FIG. 3, the user interface 70 includes a subject indication 70 indicating that the selected message is a forwarded synchronous message. A number of action buttons 74 include a first button 75 enabling the user to respond to the retrieved asynchronous message by generating another asynchronous message to be sent back to the sender of the synchronous message that was forwarded within the retrieved asynchronous message. A button 77 is also provided to enable the user to attempt to initiate a synchronous communication session with the sender of the synchronous message. The button 77 may not be presented, or not be selectable, in the event that the sender of the synchronous message is currently unavailable for synchronous communications at the time the user retrieves the asynchronous message.

If the user selects the button 77 to initiate a synchronous communication session, and the original sender is currently available for such a session, a user interface such as that shown in FIG. 2 may be generated. The synchronous communication session user interface may include a synchronous message 76, as well as an associated chat history, conveyed in the asynchronous message.

Those skilled in the art will recognize that while the user interface of FIG. 3 is shown providing button display objects for a user to select either a synchronous or asynchronous response to the received asynchronous message, the present invention is not limited to these specific mechanisms. Accordingly, any other user interface mechanisms may alternatively or additionally be presented in this regard as appropriate for a given embodiment or configuration.

Figure 4:
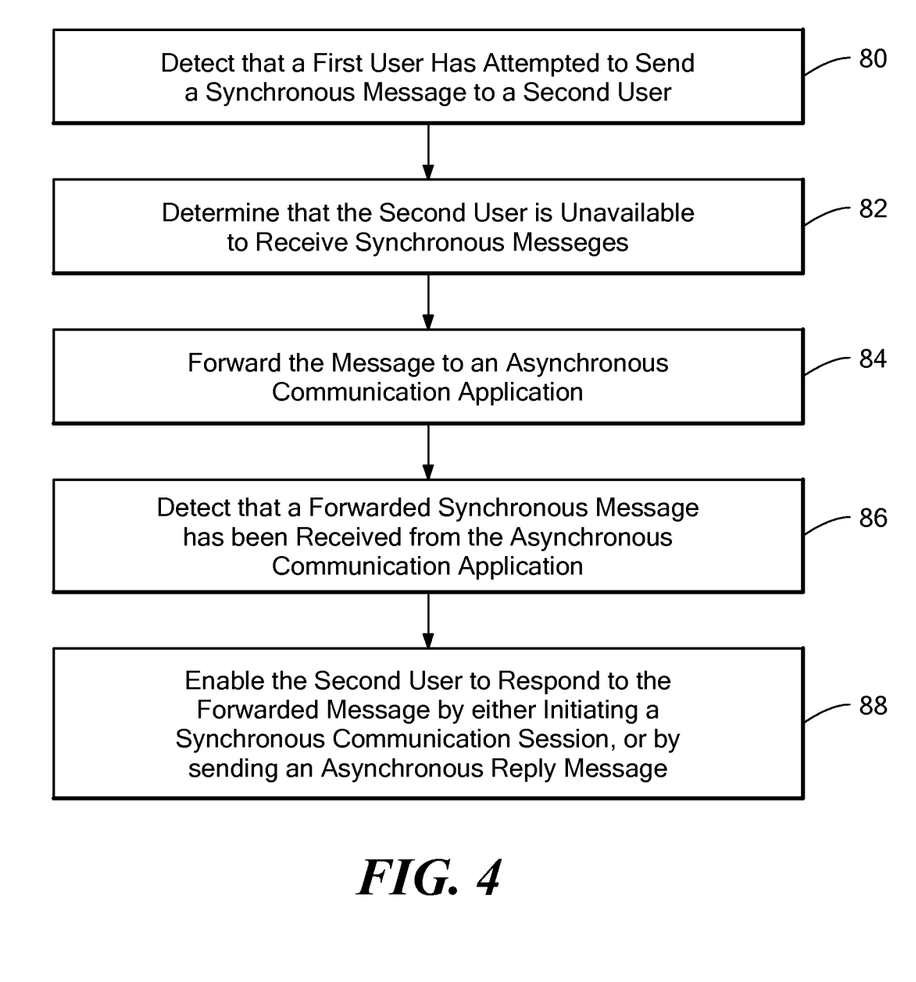
FIG. 4 is a flow chart showing steps performed in an illustrative embodiment.

FIG. 4 is a flow chart showing steps performed in an illustrative embodiment. At step 80, the disclosed system determines that a first user has attempted to send a synchronous message to a second user through a synchronous communication application. The disclosed system then determines at step 82 that the second user is not currently available to receive synchronous messages. In response to the determination at step 82, the disclosed system operates at step 84 to forward the synchronous message to an asynchronous communication application, such as an electronic mail application. For example, the determination at step 84 may be part of a determination made as to a protocol to use to send the synchronous message. In some synchronous communication applications, a determination is made as to what protocol to use to deliver a synchronous message to a specified receiving user, based on the capabilities and/or characteristics of that receiving user. In the disclosed system, one of the characteristics of the specified receiving user considered in this determination is whether they are currently available for receiving synchronous messages. If not, then at step 84 the disclosed system encapsulates the synchronous message in an asynchronous message, such as an email message, and uses an asynchronous messaging protocol, such as SMTP, to deliver the encapsulated synchronous message to the receiving user. Other information may also be encapsulated in the asynchronous message, such as the synchronous communication application handle of the sending user, and/or a chat history between the sending user and the specified receiving user. The asynchronous message may further indicate an email address of the sending user to be used for any asynchronous reply.

At step 86, the disclosed system operates to detect that an asynchronous message has been forwarded to the second user that contains a forwarded asynchronous message. The detection at step 86 may be in response to the second user retrieving the asynchronous message from an Inbox structure, or in response to the automatic detection of the message within the Inbox structure by an agent process monitoring the Inbox for such messages. In response to the detection at step 86, the disclosed system operates at step 88 to enable the receiving second user to respond to the asynchronous message by either initiating a synchronous communication session with the first user, or by sending an asynchronous message to the first user.

Figure 5:
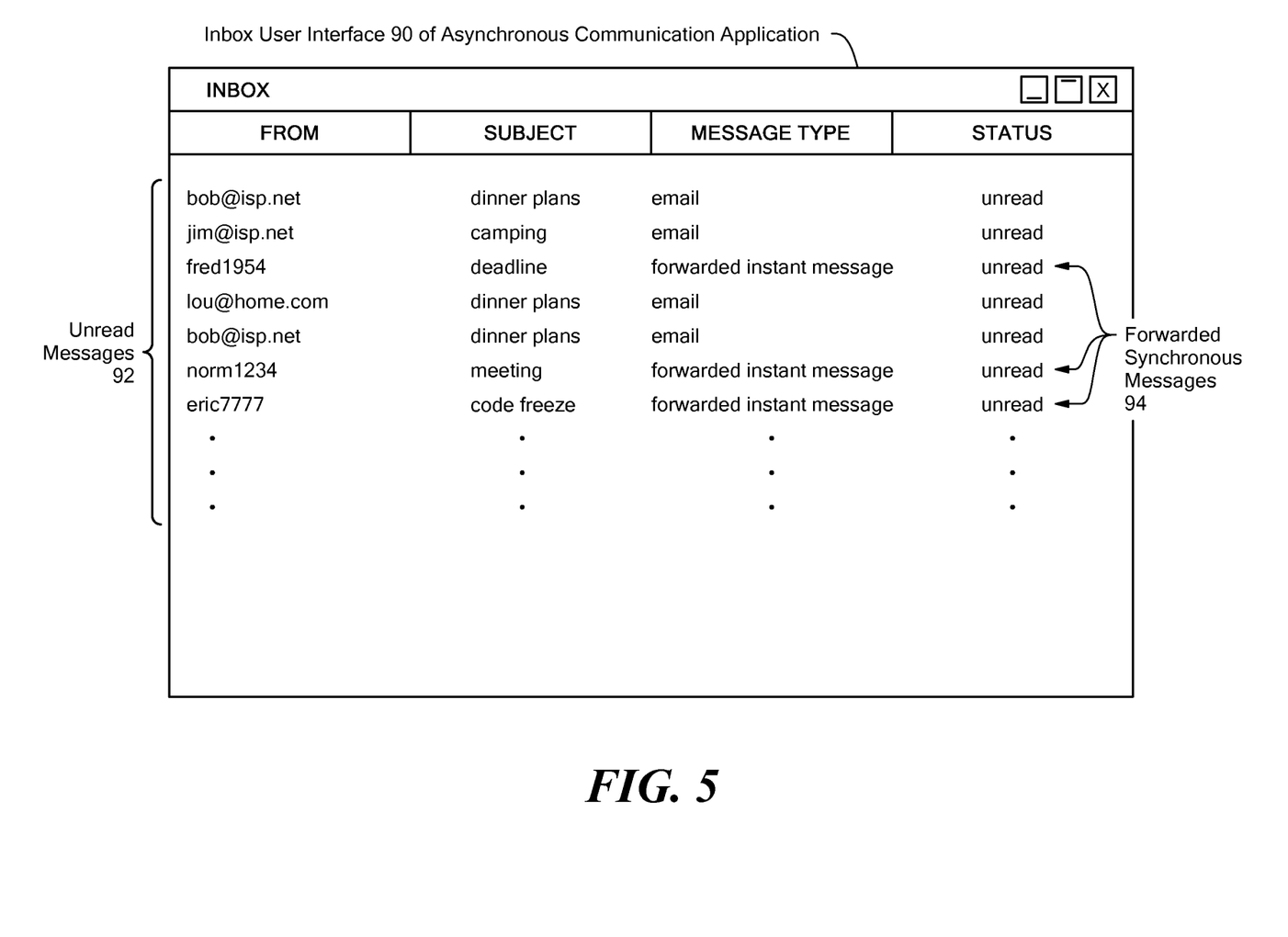
FIG. 5 is a simplified portion of a screen shot showing an example of unread asynchronous communication application messages in a user's Inbox in an illustrative embodiment.

As shown in the partial screen shot of FIG. 5, an Inbox user interface 90 of an asynchronous communication application program, such as an electronic mail application, shows a number of unread messages 92 that have not yet been selected for retrieval by a local user. The unread messages 92 are shown including a number of forwarded synchronous messages 94. In one embodiment of the disclosed system, a software agent operates to detect each of the forwarded synchronous messages 94, and automatically determines whether the sender of each such message is currently available for establishment of a synchronous communication session. If the sender of such a message is currently available, then a synchronous communication session, such as a chat or instant messaging session, is automatically established between the sender and the local user associated with the asynchronous communication application providing the user interface 90. The software process that operates to monitor the Inbox for the local user, and to cause the establishment of the synchronous communication session(s) may, for example, include the communication application blending client 28 or 30 as shown in FIG. 1.

Figure 6:
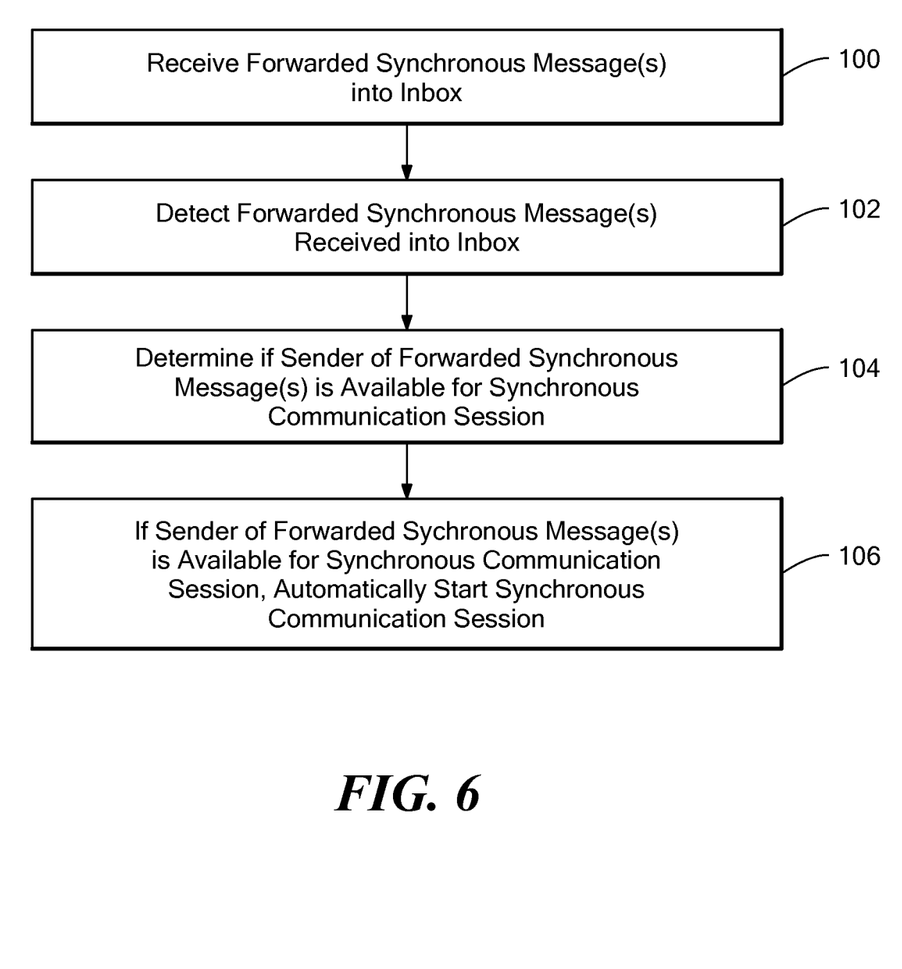
FIG. 6 is a flow chart illustrating steps performed by an illustrative embodiment of the disclosed system to automatically initiate synchronous communication sessions in response to detection of forwarded synchronous communication application messages in a user's asynchronous communication application Inbox.

FIG. 6 illustrates the steps performed by an embodiment of the disclosed system to automatically establish synchronous communication application sessions with respect to forwarded synchronous communication application messages, such as instant messages encapsulated in electronic mail messages, contained in the Inbox structure of an asynchronous communication application, such as an electronic mail application. At step 100, one or more forwarded synchronous messages are received into a an Inbox structure containing received email messages. At step 102, a periodic or event driven software agent or the like detects the forwarded synchronous communication application messages within the Inbox structure. A determination is made at step 104 as to whether the sender of the forwarded synchronous communication application message is currently available for a synchronous communication session. If so, at step 106 a synchronous communication session is automatically established between the sender and the local user receiving the forwarded synchronous communication application messages stored in the Inbox structure.

FIGS. 1, 4 and 6 are block diagram and flowchart illustrations of methods, apparatus(s) and computer program products according to an embodiment of the invention. It will be understood that each block of FIGS. 1, 4, and 6, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A method comprising:
   receiving an asynchronous message for a receiving user from an asynchronous communication application, said asynchronous message including an indication that said asynchronous message was originally sent by a sending user through a synchronous communication application; and
   automatically initiating a synchronous communication session between said receiving user and said sending user in response to said receiving of said asynchronous message, based at least in part on said indication that said asynchronous message was originally sent through said synchronous application.

2. The method of claim 1, wherein said automatically initiating said synchronous communication session between said receiving user and said sending user is further responsive to said second user retrieving said asynchronous message from said asynchronous communication application.

3. The method of claim 1, further comprising displaying a user interface to said receiving user visually indicating which individual ones of a plurality of received asynchronous messages were originally sent through said synchronous application.

4. The method of claim 1, further comprising
   displaying, responsive to said indication that said asynchronous message was originally sent through said synchronous application, a user interface to said receiving user enabling said receiving user to select between options associated with initiating said synchronous communication session between said receiving user and replying to said sending user through said asynchronous communication application; and
   wherein said automatically initiating said synchronous communication session is further responsive to said receiving user selecting one of said user interface options associated with initiating said synchronous communication session.

5. The method of claim 1, further comprising:
   determining whether said sending user is currently available for synchronous communications; and
   wherein said automatically initiating said synchronous communication session between said receiving user and said sending user is further responsive to determining that said sending user is currently available for synchronous communications.

6. The method of claim 5, further comprising:
   responsive to determining said sending user is currently unavailable for synchronous communications, enabling said receiving user to respond to said asynchronous message by sending a response message to said sending user through said asynchronous communication system.

7. The method of claim 5, wherein said sending user is determined to be currently unavailable for synchronous communications if said sending user is currently offline.

8. The method of claim 1, further comprising:
   wherein said receiving said asynchronous message comprises detecting said asynchronous message in a received message structure maintained by said asynchronous communication application;
   determining whether said sending user is available for synchronous communication; and
   wherein said automatically initiating said synchronous communication session between said receiving user and said sending user is responsive to said detecting said asynchronous message in said received message structure and determining that said sending user is available for synchronous communication.

9. A system comprising:
   at least one processor and at least one computer readable memory, said computer readable memory having program code stored thereon for, when executed on said processor, blending synchronous and asynchronous computer communication applications, said program code comprising:
     program code for receiving an asynchronous message for a receiving user from an asynchronous communication application, said asynchronous message including an indication that said asynchronous message was originally sent by a sending user through a synchronous communication application, and
     program code for automatically initiating a synchronous communication session between said receiving user and said sending user in response to said receiving of said asynchronous message, based at least in part on said indication that said asynchronous message was originally sent through said synchronous application.

10. The system of claim 9, wherein said program code for automatically initiating said synchronous communication session between said receiving user and said sending user is further responsive to said second user retrieving said asynchronous message from said asynchronous communication application.

11. The system of claim 9, said program code further comprising program code for displaying a user interface to said receiving user visually indicating which individual ones of a plurality of received asynchronous messages were originally sent through said synchronous application.

12. The system of claim 9, said program code further comprising
   program code for displaying, responsive to said indication that said asynchronous message was originally sent through said synchronous application, a user interface to said receiving user enabling said receiving user to select between options associated with initiating said synchronous communication session between said receiving user and replying to said sending user through said asynchronous communication application; and
   wherein said program code for automatically initiating said synchronous communication session is further responsive to said receiving user selecting one of said user interface options associated with initiating said synchronous communication session.

13. The system of claim 9, said program code further comprising:
   program code for determining whether said sending user is currently available for synchronous communications; and
   wherein said program code for automatically initiating said synchronous communication session between said receiving user and said sending user is further responsive to determining that said sending user is currently available for synchronous communications.

14. The system of claim 13, said program code further comprising:
   program code for, responsive to determining said sending user is currently unavailable for synchronous communications, enabling said receiving user to respond to said asynchronous message by sending a response message to said sending user through said asynchronous communication system.

15. The system of claim 13, wherein said program code for determining whether said sending user is currently available for synchronous communications determines said sending user to be currently unavailable for synchronous communications if said sending user is currently offline.

16. The system of claim 9, further comprising:
   wherein said receiving said asynchronous message comprises detecting said asynchronous message in a received message structure maintained by said asynchronous communication application;
   program code for determining whether said sending user is available for synchronous communication; and
   wherein said program code for automatically initiating said synchronous communication session between said receiving user and said sending user is responsive to said detecting said asynchronous message in said received message structure and determining that said sending user is available for synchronous communication.

17. A computer program product, comprising:
   a non-transitory computer readable storage medium having program code stored thereon for blending synchronous and asynchronous computer communication applications, said program code comprising:
      program code for receiving an asynchronous message for a receiving user from an asynchronous communication application, said asynchronous message including an indication that said asynchronous message was originally sent by a sending user through a synchronous communication application, and
      program code for automatically initiating a synchronous communication session between said receiving user and said sending user in response to said receiving of said asynchronous message, based at least in part on said indication that said asynchronous message was originally sent through said synchronous application.

\* \* \* \* \*